US008767544B1

(12) United States Patent
Khanka et al.

(10) Patent No.: US 8,767,544 B1
(45) Date of Patent: Jul. 1, 2014

(54) DATA RATE SELECTION FOR WIRELESS COMMUNICATION DEVICES

(75) Inventors: Bhagwan Singh Khanka, Lenexa, KS (US); Sachin R. Vargantwar, Overland Park, KS (US); Jasinder Pal Singh, Olathe, KS (US); Mark Edward Hanna, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 513 days.

(21) Appl. No.: 12/615,883

(22) Filed: Nov. 10, 2009

(51) Int. Cl.
*H04L 25/05* (2006.01)
*H04W 4/00* (2009.01)
*H04J 3/22* (2006.01)

(52) U.S. Cl.
USPC ...... 370/232; 370/332; 455/432.1; 455/435.2

(58) Field of Classification Search
USPC .............. 370/230, 230.1, 232–235, 252–254, 370/329, 331–333, 395.2, 395.21, 395.3, 370/395.31, 395.32; 455/432.1–435.3, 455/436–444, 450–452.2; 709/217–219, 709/225–234
See application file for complete search history.

(56) References Cited

U.S. PATENT DOCUMENTS

| | | | |
|---|---|---|---|
| 6,148,197 A | 11/2000 | Bridges et al. | |
| 6,397,064 B1 | 5/2002 | Bridges et al. | |
| 6,546,246 B1 | 4/2003 | Bridges et al. | |
| 6,741,862 B2 | 5/2004 | Chung et al. | |
| 7,403,800 B2 | 7/2008 | Han et al. | |
| 8,023,425 B2 * | 9/2011 | Raleigh | 370/252 |
| 2002/0087674 A1 * | 7/2002 | Guilford et al. | 709/223 |
| 2004/0151136 A1 | 8/2004 | Gage | |
| 2006/0161503 A1 * | 7/2006 | Popescu et al. | 705/400 |
| 2006/0171356 A1 | 8/2006 | Gurelli et al. | |
| 2006/0194547 A1 * | 8/2006 | Davis | 455/69 |
| 2006/0203765 A1 * | 9/2006 | Laroia et al. | 370/328 |
| 2006/0205396 A1 * | 9/2006 | Laroia et al. | 455/422.1 |
| 2008/0062934 A1 * | 3/2008 | Zhao | 370/332 |
| 2009/0161632 A1 * | 6/2009 | Palenius et al. | 370/335 |
| 2010/0197294 A1 * | 8/2010 | Fox et al. | 455/422.1 |
| 2010/0232355 A1 * | 9/2010 | Richeson et al. | 370/328 |
| 2010/0260063 A1 * | 10/2010 | Kubler et al. | 370/253 |
| 2012/0110140 A1 * | 5/2012 | Chapweske | 709/219 |

\* cited by examiner

*Primary Examiner* — Habte Mered

(57) ABSTRACT

What is disclosed is a method of operating a wireless communication device. The method includes accessing a wireless access system to receive a communication service, determining a service operator of the wireless access system, and selecting a data rate based on the service operator of the wireless access system. The method also includes requesting the selected data rate for the communication service from the wireless access system, and receiving the communication service at the selected data rate from the wireless access system.

16 Claims, 5 Drawing Sheets

US 8,767,544 B1

DATA RATE SELECTION FOR WIRELESS COMMUNICATION DEVICES

TECHNICAL FIELD

Aspects of the disclosure are related to the field of communications, and in particular, data rate selection for wireless communication devices in wireless communication networks.

TECHNICAL BACKGROUND

Wireless communication devices, such as cellular phones, are typically used to provide mobile and wireless communication services to users across a wireless access system or wireless communication network. These wireless communication devices can allow a user to access communication services such as voice calls, data exchange, text messaging, multimedia streaming, Internet access, or other services. When wireless communication devices desire to access communication services from the wireless access system, a registration process typically occurs. As a part of this registration process, the wireless communication devices receive overhead information and signaling related to the wireless links over which the communication services are exchanged.

Many times, the wireless communication devices are mobile communication devices which allow users to move between wireless coverage areas of a native or home wireless access system. Additionally, the wireless communication devices can move through wireless coverage areas operated by different service operators than the home service operator, typically referred to as roaming. However, when a wireless communication device receives a communication service through a roaming wireless access system, additional usage charges and penalties are typically levied against the customer.

Overview

What is disclosed is a method of operating a wireless communication device. The method includes accessing a wireless access system to receive a communication service, determining a service operator of the wireless access system, and selecting a data rate based on the service operator of the wireless access system. The method also includes requesting the selected data rate for the communication service from the wireless access system, and receiving the communication service at the selected data rate from the wireless access system.

What is also disclosed is a wireless communication device. The wireless communication device includes a transceiver configured to access a wireless access system to receive a communication service. The wireless communication device also includes a processing system configured to determine a service operator of the wireless access system, select a data rate based on the service operator of the wireless access system, and request the selected data rate for the communication service from the wireless access system. The transceiver is also configured to receive the communication service at the selected data rate from the wireless access system.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
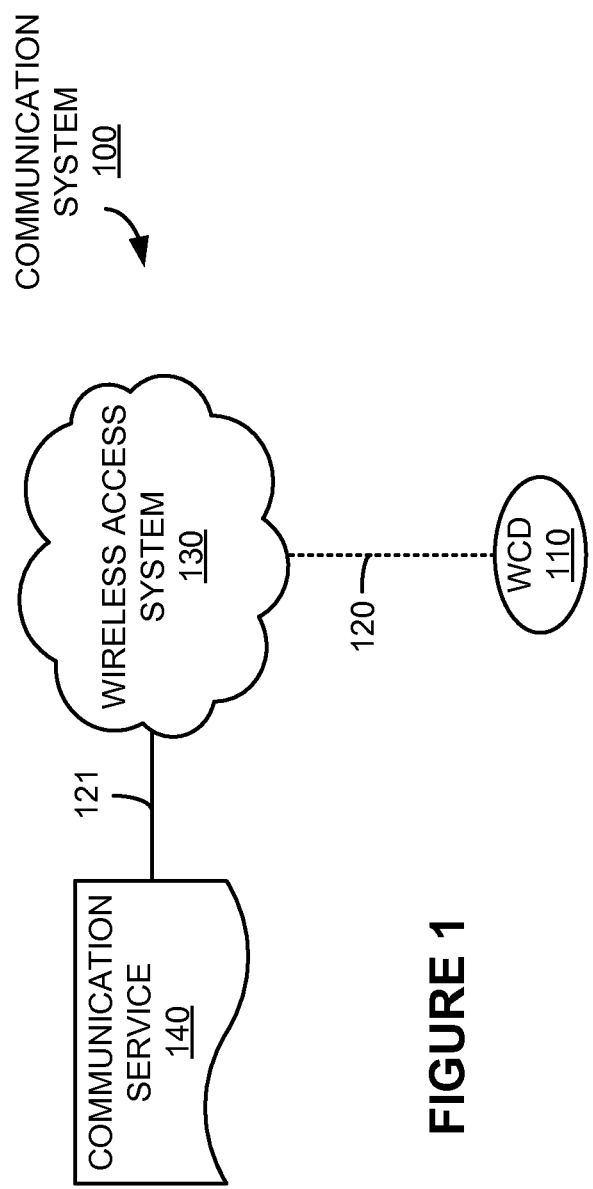
FIG. 1 is a system diagram illustrating a communication system.

FIG. 1 is a system diagram illustrating communication system 100. Communication system 100 includes wireless communication device (WCD) 110, wireless access system 130, and communication service 140. Wireless communication device 110 and wireless access system 130 communicate over wireless link 120. Wireless access system 130 and communication service 140 communicate over link 121. In FIG. 1, wireless communication device 110 can exchange user communications and overhead communications related to accessing wireless access system 130 and communication service 140 over wireless link 120. Communication service 140 could include communication services such as voice calls, data exchange, text messaging, emergency services, multimedia streaming, Internet access, or other communication services.

Figure 2:
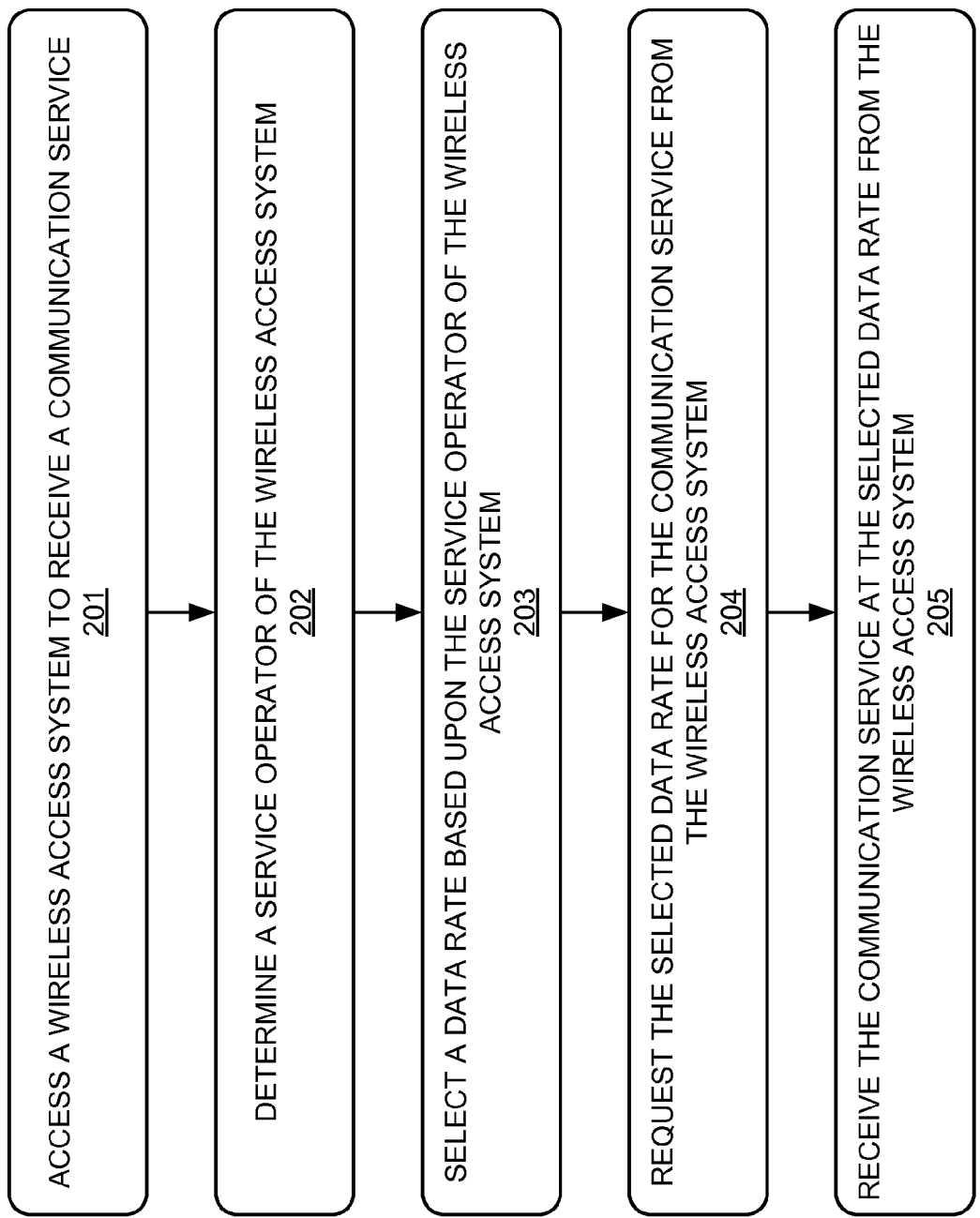
FIG. 2 is a flow diagram illustrating a method of operation of a communication system.

FIG. 2 is a flow diagram illustrating a method of operation of communication system 100. The operations of FIG. 2 are referenced herein parenthetically. In FIG. 2, wireless communication device 110 accesses (201) wireless access system 130 to receive communication service 140. When wireless communication device 110 desires to access communication service 140 through wireless access system 130, a registration process typically occurs. As a part of this registration process, wireless communication device 110 receives overhead information and signaling related to wireless link 120 to coordinate the user communications of communication service 140. Wireless communication device 110 could exchange further user communications and overhead communications with wireless access system 130.

Wireless communication device 110 determines (202) a service operator of wireless access system 130. In some examples, a service operator includes a company or operating entity for wireless access system 130. In other examples, determining a service operator of wireless access system 130 includes determining if wireless access system 130 provides roaming access for wireless communication device 110. Roaming access typically occurs when wireless communication device 110 accesses a communication service through a wireless access system which is not provided by a home or native service operator. Wireless communication device 110 then selects (203) a data rate based upon the service operator of wireless access system 130. The data rate could be selected to be a different rate from that proposed or determined by wireless access system 130. Other communication parameters could also be selected based upon the service operator of wireless access system 130. Wireless communication device 110 requests (204) the selected data rate for communication service 140 from wireless access system 130. In some examples, the selected data rate is requested via overhead communication portions of wireless link 120. Wireless communication device 110 then receives (205) communication service 140 at the selected data rate from wireless access system 130. Communication service 140 could include receiving user communications and overhead communications.

Figure 3:
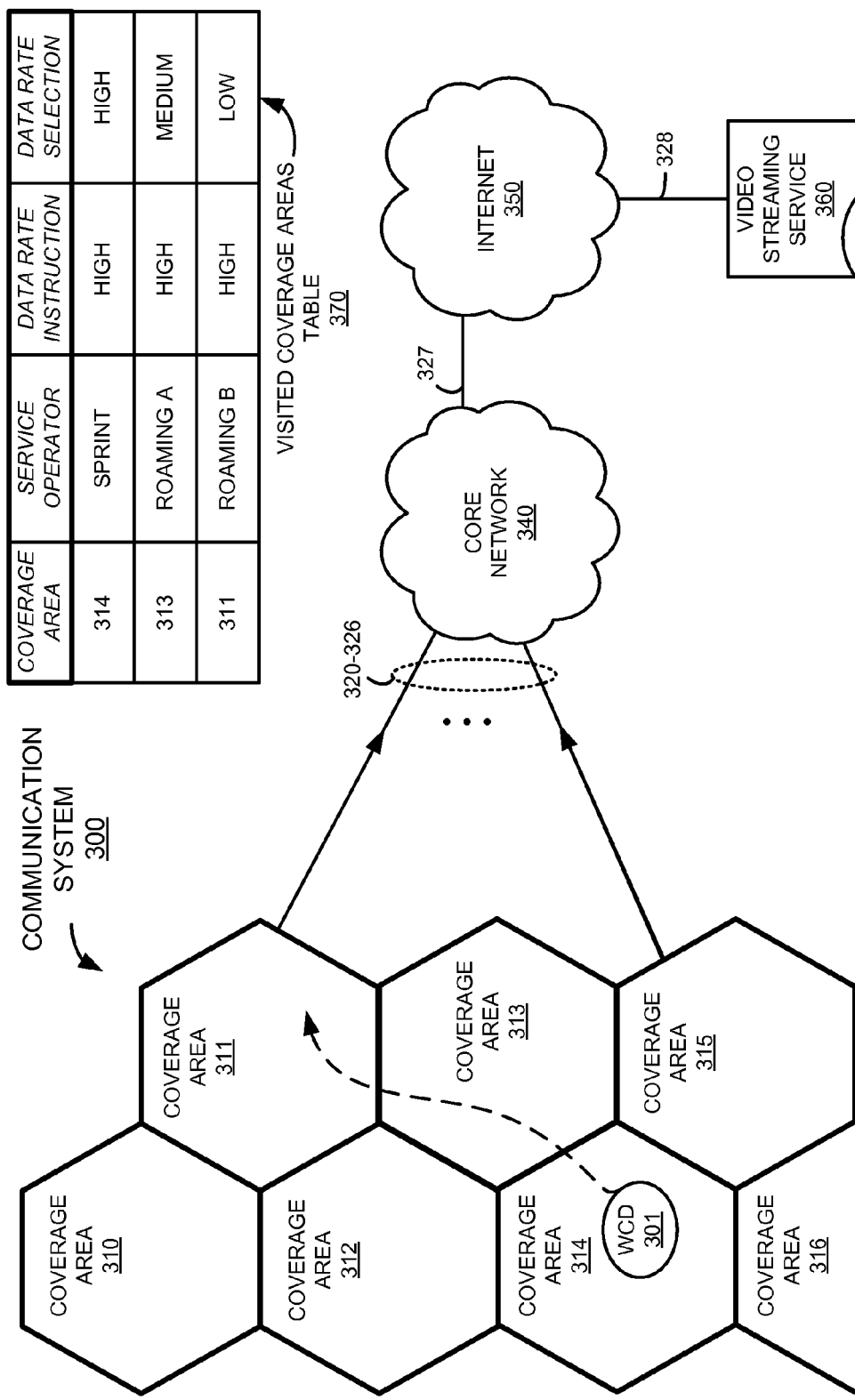
FIG. 3 is a system diagram illustrating a communication system.

FIG. 3 is a system diagram illustrating communication system 300. Communication system 300 includes wireless communication device (WCD) 301, coverage areas 310-316, core network 340, Internet 350, and video streaming service 360. FIG. 3 also includes table 370, which includes a list of visited coverage areas of wireless communication device 301. Base station equipment in each coverage area 310-316 communicates individually with core network 340 over links 320-326, respectively. In this example, links 320-326 are T1 links. Core network 340 and Internet 350 communicate over link 327. In this example, link 327 is a metropolitan-area network (MAN) optical network link. Internet 350 and video streaming service 360 communicate over link 328. In this example, link 328 is an optical networking link capable of carrying Internet protocol (IP) packets. Also in this example, wireless communication device 301 is a mobile smartphone and can communicate over wireless links to at least one of coverage areas 310-316, depending upon the present location of wireless communication device 301, among other factors. Wireless communication device 301 communicates using the code-division multiple access (CDMA) wireless protocol, although other wireless protocols could be employed.

As shown in FIG. 3, each coverage area 310-316 has a limited geographic range over which wireless access is provided to wireless communication devices. The limited range is indicated by the hexagonal-shaped wireless coverage area 310-316 in FIG. 3. Although a hexagonal region defining the coverage areas is shown in FIG. 3, it should be understood that the coverage areas could be of other shapes and configurations, as determined by geographic features, empirical data, radio frequency (RF) conditions, the associated equipment, or by other factors, including combinations thereof. Although not shown for clarity, a base station or other base station equipment in each of coverage areas 310-316 provides wireless communication access for wireless communication devices that may be located within each respective coverage area. Base station equipment could include RF communication and control circuitry and antennas, and includes wireless communications equipment capable of communicating with and providing communication service to wireless communication devices. Each coverage area 310-316 could include further wireless communication equipment and systems.

Core network 340 is a core network of a wireless access system in this example. Core network 340 could include further base stations, routers, gateways, controller systems, processing systems, or other communication equipment. Internet 350 includes the Internet and could also include associated routers, gateways, communication links, servers, or other communication equipment for exchanging and routing IP data packets. Video streaming service 360 includes computer equipment, application servers, storage systems, and other video streaming equipment for hosting and serving video or other multimedia content over link 328. In some examples, video streaming service 360 includes live-video production and digitization equipment and systems for streaming video of live events, such as sporting events, news, or other content.

Figure 4:
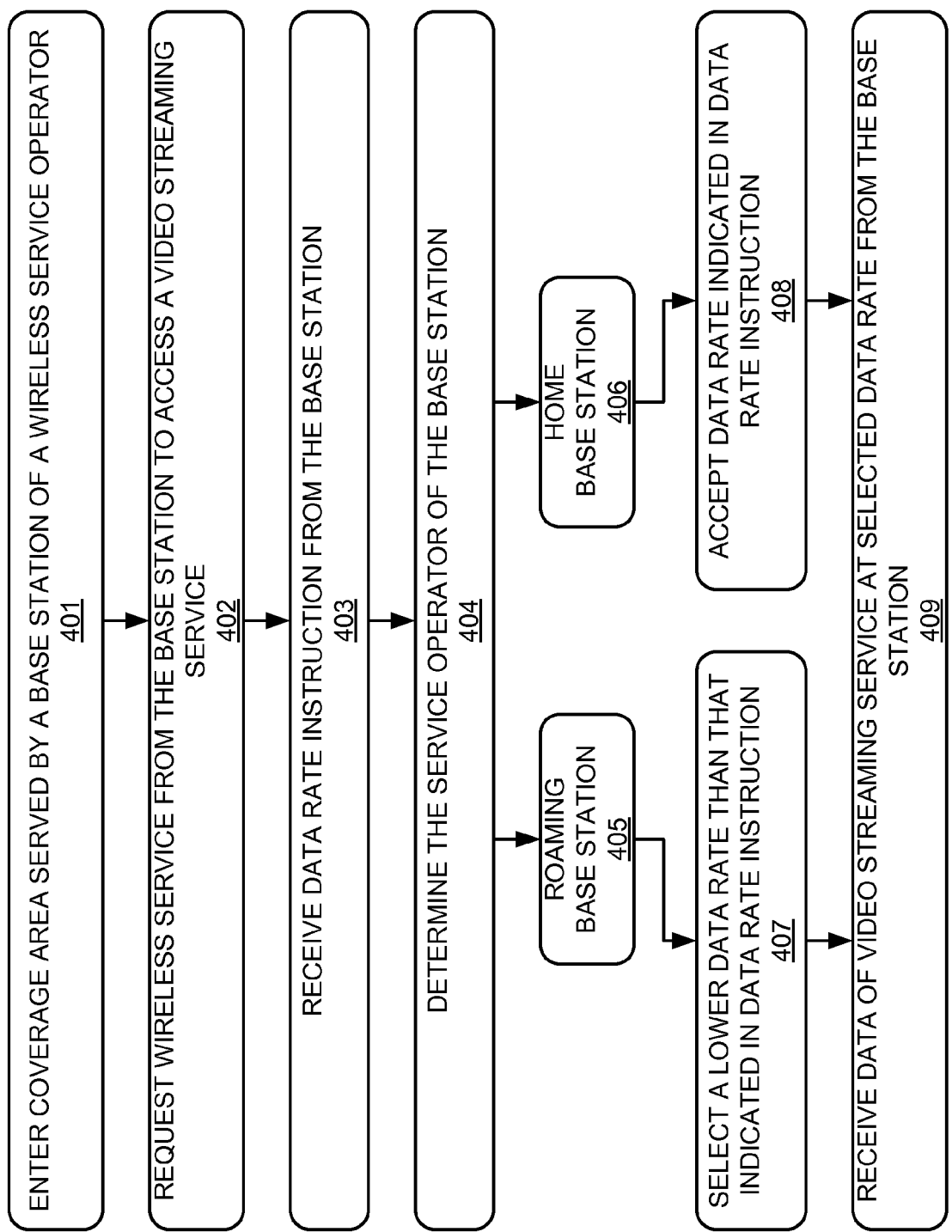
FIG. 4 is a flow diagram illustrating a method of operation of a communication system.

FIG. 4 is a flow diagram illustrating a method of operation of communication system 300. The operations of FIG. 4 are referenced herein parenthetically. In FIG. 4, wireless communication device 301 enters (401) a coverage area served by a base station of a wireless service operator. In this example, since wireless communication device 301 is a mobile communication device, it can be moved between different coverage areas. As shown by the dashed-line path in FIG. 3, wireless communication device 301 starts in coverage area 314, is moved through coverage area 313, and ends in coverage area 311, although different paths and coverage areas could be used in other examples. Also, as shown in FIG. 3, table 370 includes information regarding the visited coverage areas, namely coverage areas 314, 313, and 311.

Within each respective coverage area visited by wireless communication device 301, wireless communication device 301 requests (402) wireless connectivity from the associated base station to access video streaming service 360. The request process could also include a wireless service registration process, and could further include initiating a communication session. Coverage area 314 is the first coverage area visited by wireless communication device 301, and thus wireless communication device 301 first requests wireless connectivity from the base station serving coverage area 314. Subsequent visits to other coverage areas operate similarly. During the request or registration process within the respective coverage area, wireless communication device 301 receives (403) a data rate instruction from the base station associated with the coverage area. The data rate instruction could include a proposed data rate control (DRC) level, which could indicate a transfer rate of data—such as bits per second, a bandwidth measurement, a power level—such as watts or decibels, or some other indicator. As shown in table 370, when visiting each coverage area, wireless communication device 301 receives a data rate instruction of "high," although it should be understood that other data rate instructions could be received. In some examples, the data rate instruction is a part of overhead or control communications exchanged between a base station and wireless communication device 301, such as in an access parameter message (APM), system parameter message (SPM), or extended channel assignment message (ECAM). In other examples, the data rate instruction could be a part of user communications exchanged between a base station and wireless communication device 301.

Wireless communication device 301 determines (404) the service operator of the base station of the respective coverage area. A service operator can be determined during registration or initialization of access of wireless communication device 301 with the base station of the respective coverage area. For example, a pilot signal or beacon could include information about the service provider, as could other overhead communications received by wireless communication device 301 when accessing a base station. As shown in table 370 of FIG. 3, coverage area 314 has a service operator of Sprint. In this example, Sprint is the home or native service operator. A home service operator includes the service operator through which the user of a wireless communication device pays for and receives wireless communication service. For example, a customer of Sprint would have Sprint as the home service operator. Also, as shown in table 370 of FIG. 3, coverage area 313 has a service operator of "roaming A" and coverage area 311 has a service operator of "roaming B." A roaming service operator typically includes service operators through which the user of a wireless communication device does not pay for service directly. For example, a Sprint customer could be considered roaming when visiting the coverage areas of other non-Sprint service providers. Thus, wireless communication device 301 determines that communication service provided by coverage areas 313 and 311 is provided by roaming base stations (405), while communication service provided by coverage area 314 is provided by a home base station (406).

When visiting a roaming coverage area, such as coverage areas 313 and 311, wireless communication device 301 selects (407) a lower data rate than that indicated in the respectively received data rate instruction. For example, table 370 of FIG. 3 indicates that coverage area 313, a roaming coverage area, has a data rate instruction of "high," but wireless communication device 301 selects a different data rate of "medium." Also, as shown in table 370 of FIG. 3, coverage area 311, a roaming coverage area, has a data rate instruction of "high," but wireless communication device 301 selects a different data rate of "low." In contrast, coverage area 314, a home coverage area, has a data rate instruction of "high," and wireless communication device 301 selects the same data rate as indicated in the data rate instruction. It should be understood that the coverage areas and associated data rate instructions and selections are merely illustrative, and different service operators and data rates could be used. The selected data rate could include a DRC indication, although other indicators of data rate could be employed. Wireless communication device 301 could also employ a table or list of associations between various service operators and desired data rates. The table could also include associations corresponding to carrier-to-interference (C/I) ratios, signal-to-noise ratios, times of day, dates, or other parameters for the wireless link between wireless communication device 301 and the present base station. Different data rates could be associated with each service operator and C/I parameters.

In examples where a different data rate is selected than that provided in the data rate instruction, wireless communication device 301 could report the selected data rate to the wireless access system, such as to an associated base station. In further examples where a different data rate is selected than that provided in the data rate instruction, wireless communication device 301 could request the selected data rate from the wireless access system. The data rate request could be handled by a base station in the respective coverage area, or could be forwarded by a base station to further communication systems, such as core network 340. In addition to, or alternately from a data rate selection, wireless communication device 301 could also select a transmit power level of wireless communication device 301, a transmit power level of a base station associated with the present coverage area, a wireless carrier, a wireless channel, or a data rate or power level within a particular carrier or channel, among other parameters. Likewise, in addition to, or alternately from determining a service operator to select a parameter, such as data rate, other selection criteria could be used, such as a company name, company type, an associated cost of data transfer, a cost of a communication service through the particular service operator, or wireless protocol type, among other selection criteria.

Once a data rate has been selected by wireless communication device 301, wireless communication device 301 receives (409) data of video streaming service 360 at the selected data rate form an associated base station in the present coverage area. In this example, video data from video streaming service 360 is provided over Internet 350, core network 340, and the base station with the present coverage area.

In further examples, wireless communication device 301 could employ application-based throttling. In application-based throttling, wireless communication device 301 could select a data transfer rate for a particular user application on wireless communication device 301 based upon the service operator, among other selection criteria. If the present service operator is a roaming service operator, then the data transfer rate could be selected to be a lower data transfer rate. A selected data transfer rate could be selected to be equivalent to the aforementioned data rate, or DRC. In this manner, a DRC between a base station of the present coverage area could remain at the level proposed or instructed by the base station of the service operator while a different effective data transfer rate is enforced upon an application by wireless communication device 301. For example, in coverage area 313, a high data rate could be both instructed and selected by wireless communication device 301, but wireless communication device 301 could enforce a different data download rate within an application of wireless communication device 301. In other examples, wireless communication device 301 could select a different resolution of video from video streaming service 360, or a different compression scheme of media from video streaming service 360. In further examples, a video streaming application or media streaming application run on wireless communication device 301 could be throttled to achieve the desired data download rate based upon the present service operator, or based upon other parameters. In yet further examples, when a data rate is selected and requested, as discussed above, the requested data rate might be denied by the service operator. If the requested data rate is denied, then wireless communication device 301 could employ application-based throttling to achieve the desired data rate.

Figure 5:
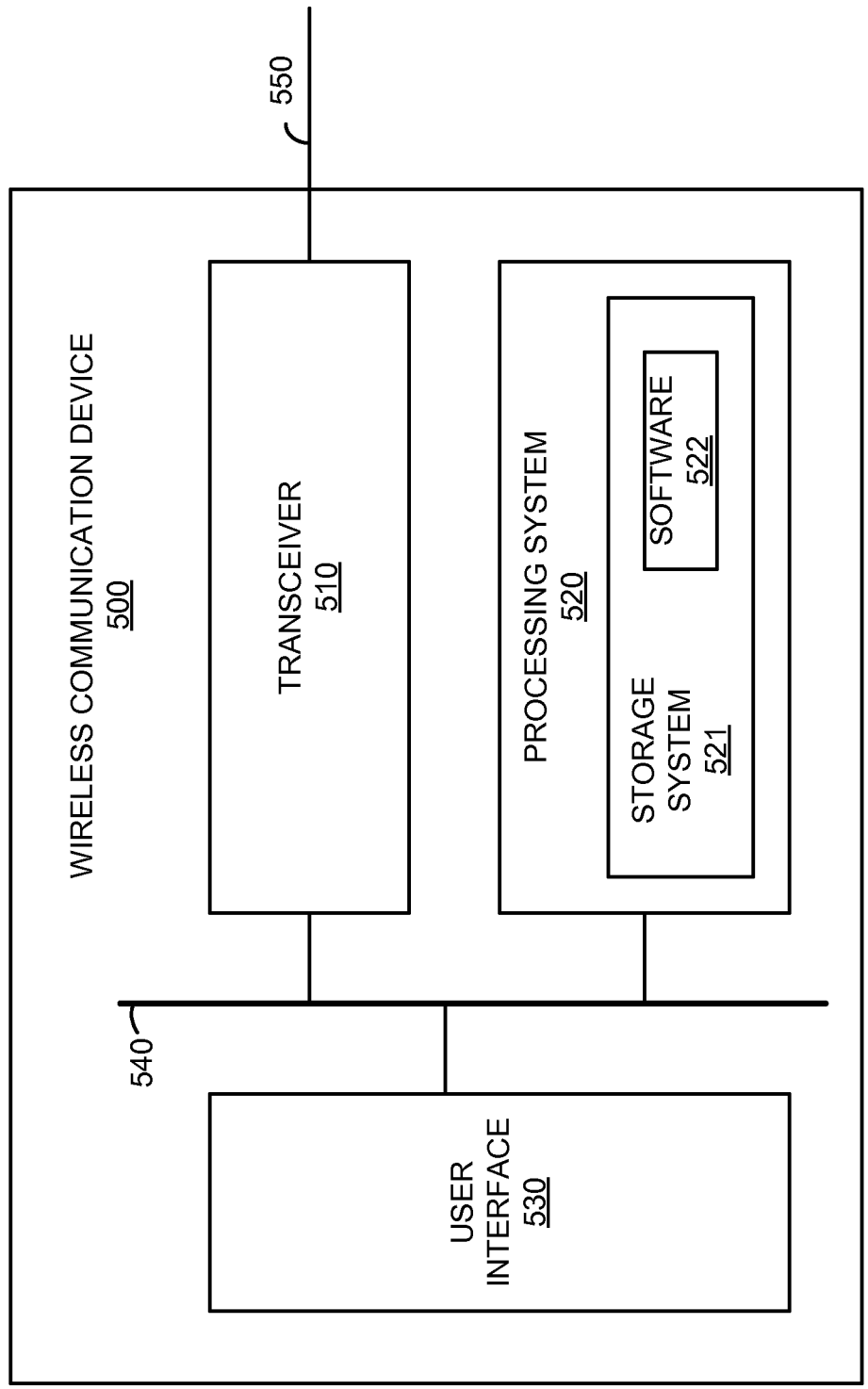
FIG. 5 is a block diagram illustrating a wireless communication device.

FIG. 5 is a block diagram illustrating wireless communication device 500, as an example of wireless communication device 110 found in FIG. 1 or wireless communication device 301 in FIG. 3, although wireless communication devices 110 and 301 could use other configurations. Wireless communication device 500 includes transceiver 510, processing system 520, and user interface 530. Transceiver 510, processing system 520, and user interface 530 communicate over bus 540. Wireless communication device 500 may be distributed or consolidated among devices that together form elements 510, 520-522, 530, 540, and 550.

Transceiver 510 comprises radio frequency (RF) communication circuitry and antenna elements. Transceiver 510 could also include amplifiers, filters, modulators, and signal processing circuitry. In this example, transceiver 510 can exchange instructions and information with processing system 520. Transceiver 510 also communicates with wireless access nodes and systems, such as base stations, omitted for clarity, over wireless link 550, to access communication services and exchange communications of the communication services. Wireless link 550 could use various protocols or communication formats as described herein for wireless link 120, including combinations, variations, or improvements thereof.

Processing system 520 includes storage system 521. Processing system 520 retrieves and executes software 522 from storage system 521. Processing system 520 could incorporate a computer microprocessor, logic circuit, or some other processing device, and may be distributed among multiple processing devices. Processing system 520 or user interface 530 could be located within the same equipment or circuitry in which transceiver 510 is located. Storage system 521 could include computer-readable media such as disks, tapes, integrated circuits, servers, or some other memory device, and also may be distributed among multiple memory devices. Software 522 may include an operating system, logs, utilities, drivers, networking software, and other software typically loaded onto a computer system. Software 522 could contain an application program, firmware, or some other form of computer-readable processing instructions. When executed by processing system 520, software 522 directs wireless communication device 500 to operate as described herein to at least determine a service operator of a wireless access system, select a data rate, and access a communication service through a wireless access system in coordination with transceiver 510.

User interface 530 includes equipment and circuitry for receiving user input and control. Examples of the equipment and circuitry for receiving user input and control include push buttons, touch screens, selection knobs, dials, switches, actuators, keys, keyboards, pointer devices, microphones, transducers, potentiometers, non-contact sensing circuitry, or other human-interface equipment. User interface 530 also includes equipment to communicate information to a user of wireless communication device 500. Examples of the equipment to communicate information to the user could include indicator lights, lamps, light-emitting diodes, displays, haptic feedback devices, audible signal transducers, speakers, buzzers, alarms, vibration devices, or other indicator equipment, including combinations thereof.

Bus 540 comprises a physical, logical, or virtual communication link, capable of communicating data, control signals, communications, and power, along with other information and signals. In some examples, bus 540 is encapsulated within the elements of transceiver 510, processing system 520, or user interface 530, and may be a software or logical link. In other examples, bus 540 uses various communication media, such as air, space, metal, optical fiber, or some other signal propagation path, including combinations thereof. Bus 540 could be a direct link or might include various equipment, intermediate components, systems, and networks.

Referring back to FIG. 1, wireless communication device 110 comprises radio frequency (RF) communication circuitry and antenna elements. The RF communication circuitry typically includes amplifiers, filters, modulators, and signal processing circuitry. In many examples, wireless communication device 110 includes circuitry and equipment to wirelessly access communication services over wireless link 120. Wireless communication device 110 may also include user interface systems, memory devices, computer-readable storage mediums, software, processing circuitry, or some other communication components. Wireless communication device 110 may be a telephone, mobile wireless telephone, computer, e-book, smartphone, mobile Internet appliance, wireless network interface card, media player, game console, or some other wireless communication apparatus, including combinations thereof.

Communication service 140 may be an application server, emergency service, Internet service, application service, voice service, data service, multimedia service, or other communication service. The communication service provided by communication service 140 could include voice calls, data exchange, text messaging, multimedia streaming, Internet access, or other services. In other examples, communication service 140 is operated by an emergency service provider, such as police, fire, first responder, or other emergency service providers. Communication service 140 and link 121 could be encapsulated within the equipment of wireless access system 130.

Wireless access system 130 comprises RF communication and control circuitry, antenna elements, and communication routing equipment and systems. The RF communication circuitry typically includes amplifiers, filters, RF modulators, and signal processing circuitry. In many examples, wireless access system 130 includes equipment to provide communication service 140 to wireless communication device 110, and route communications between communication service 140 and wireless communication device 110. Wireless access system 130 may also comprise routers, servers, memory devices, software, processing circuitry, cabling, network communication interfaces, physical structural supports, or other communication apparatuses. Wireless access system 130 could include base stations, base transceiver stations, base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other wireless communication systems, including combinations thereof. Wireless access system 130 may also comprise optical networks, asynchronous transfer mode (ATM) networks, packet networks, metropolitan-area networks (MAN), or other network topologies, equipment, or systems, including combinations thereof. In typical examples, wireless access system 130 includes many wireless access nodes and associated equipment for providing communication services to many wireless communication devices across a geographic region.

Wireless link 120 uses the air or space as the transport media. Wireless link 120 may use various protocols, such as Code Division Multiple Access (CDMA), Evolution Data Optimized (EVDO), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), or some other wireless communication format, including combinations, improvements, or variations thereof.

Communication link 121 uses metal, glass, optical, air, space, or some other material as the transport media. Communication link 121 could use various communication protocols, such as Time Division Multiplex (TDM), asynchronous transfer mode (ATM), Internet Protocol (IP), Ethernet, synchronous optical networking (SONET), communication signaling, or some other communication format, including combinations, improvements, or variations thereof. In some examples, communication link 121 includes a circuit-switched voice link between wireless service provider 130 and communication service 140.

Links 120-121 may each include many different signals sharing the same link—as represented by the associated lines in FIG. 1—comprising access channels, forward links, reverse links, user communications, communication sessions, overhead communications, frequencies, channels, carriers, timeslots, transportation ports, logical transportation links, network sockets, packets, or communication directions. Communication links 120-121 could each be direct links or may include intermediate networks, systems, or devices. In many examples, the portion of wireless link 120 as transmitted by wireless communication device 110 is referred to an uplink or reverse link of the wireless link, while the portion as transmitted by wireless access system 130 is referred to as a downlink or forward link of the wireless link.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device, the method comprising:

accessing a wireless access system to receive a communication service;

determining a service operator of the wireless access system;

receiving an instruction for a proposed data rate from the wireless access system, the proposed data rate comprising a data rate control (DRC) level for wireless communications between the wireless communication device and the wireless access system;

when the service operator comprises a roaming service operator, determining a selected data rate lower than the proposed data rate and responsively requesting the selected data rate for the communication service from the wireless access system instead of accepting the proposed data rate, and if the wireless access system denies the request for the selected data rate, then accepting the proposed data rate and throttling a data download rate of an application on the wireless communication device to be at the selected data rate by selecting a different compression scheme of the application;

when the service operator comprises a home service operator, determining the selected data rate as the proposed data rate; and receiving the communication service at the selected data rate.

2. The method of claim 1, wherein:

accessing the wireless access system comprises requesting the communication service from the wireless access system and receiving the proposed data rate from the wireless access system indicating a proposed data rate for the communication service;

and requesting the selected data rate comprises determining that the proposed data rate is different from the selected data rate.

3. The method of claim 1, wherein determining the service operator of the wireless access system comprises determining if the service operator of the wireless access system provides roaming communication service to the wireless communication device.

4. The method of claim 1, further comprising:

selecting a transmit power level for the communication service based on the service operator of the wireless access system.

5. The method of claim 1, wherein the application on the wireless communication device comprises a media streaming application.

6. The method of claim 5, wherein throttling the data download rate of the application comprises selecting a different resolution of a video in the media streaming application.

7. The method of claim 5, wherein throttling the data download rate of the application to be at the selected rate by selecting the different compression scheme of the application comprises selecting a new compression scheme of media in the media streaming application.

8. The method of claim 1, wherein accessing the wireless access system to receive the communication service comprises wirelessly accessing a base station of the wireless access system to receive the communication service.

9. A wireless communication device, comprising:

a transceiver configured to access a wireless access system to receive a communication service;

a processing system configured to determine a service operator of the wireless access system, receive an instruction for a proposed data rate transferred by the wireless access system, the instruction for the proposed data rate comprising a data rate control (DRC) level for wireless communications between the wireless communication device and the wireless access system, determine a selected data rate lower than the proposed data rate when the service operator comprises a roaming service operator and responsively request the selected data rate for the communication service from the wireless access system instead of accepting the proposed data rate;

the processing system configured to accept the proposed data rate and throttle a data download rate of an application on the wireless communication device to be at the selected data rate by selecting a different compression scheme of the application if the wireless access system denies the request for the selected data rate;

the processing system configured to determine the selected data rate as the proposed data rate when the service operator comprises a home service operator; and the transceiver configured to receive the communication service at the selected data rate.

10. The wireless communication device of claim 9, comprising:

the transceiver configured to request the communication service from the wireless access system, receive the proposed data rate from the wireless access system indicating a proposed data rate for the communication service; and the processing system configured to determine that the proposed data rate is different from the selected data rate.

11. The wireless communication device of claim 9, comprising:

the processing system configured to determine if the service operator of the wireless access system provides roaming communication service to the wireless communication device.

12. The wireless communication device of claim 9, comprising:

the processing system configured to select a transmit power level for the communication service based on the service operator of the wireless access system.

13. The wireless communication device of claim 9, wherein the application on the wireless communication device comprises a media streaming application.

14. The wireless communication device of claim 13, wherein the processing system is configured to select a different resolution of a video in the media streaming application to throttle the data download rate of the application.

15. The wireless communication device of claim 13, wherein the processing system is configured to select the different compression scheme of the application by selecting a new compression scheme of media in the media streaming application to throttle the data download rate of the application.

16. The wireless communication device of claim 9, wherein the transceiver is configured to wirelessly access a base station of the wireless access system to access the wireless access system to receive the communication service.

* * * * *